Jan. 2, 1934.  E. BIANCALANA  1,942,082
REFRIGERATED MEAT GRINDER
Filed March 25, 1932   2 Sheets-Sheet 1

Inventor
Eugene Biancalana

By Clarence A. O'Brien
Attorney

Jan. 2, 1934. E. BIANCALANA 1,942,082
REFRIGERATED MEAT GRINDER
Filed March 25, 1932 2 Sheets-Sheet 2
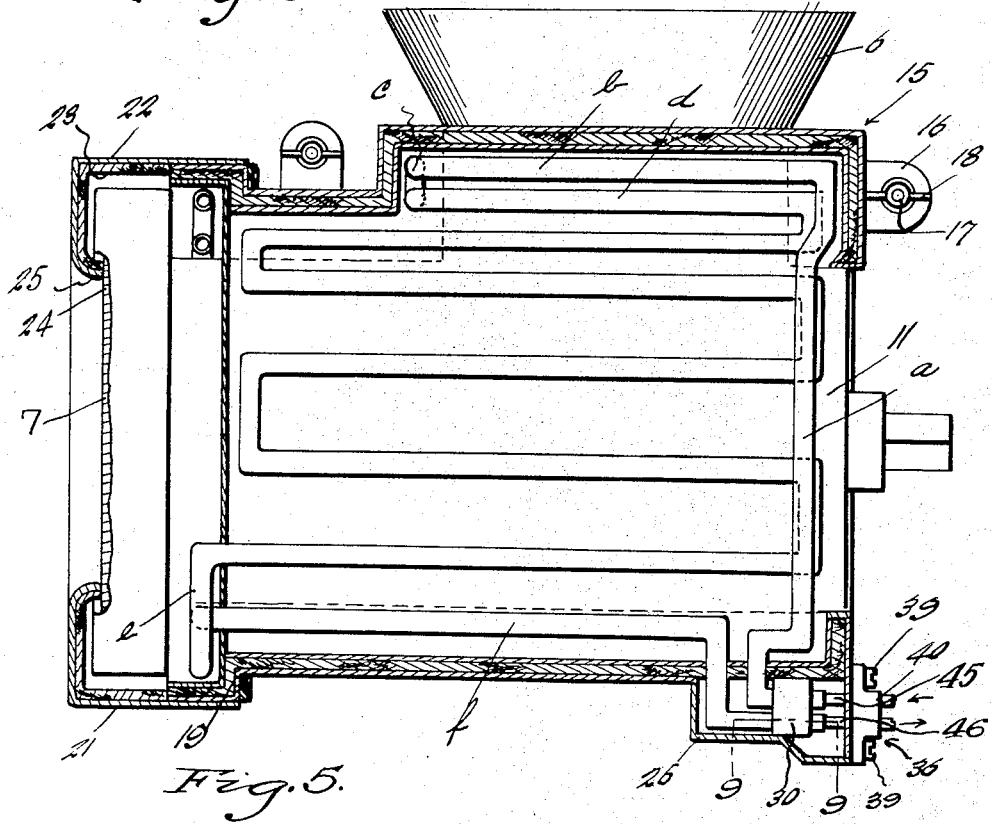
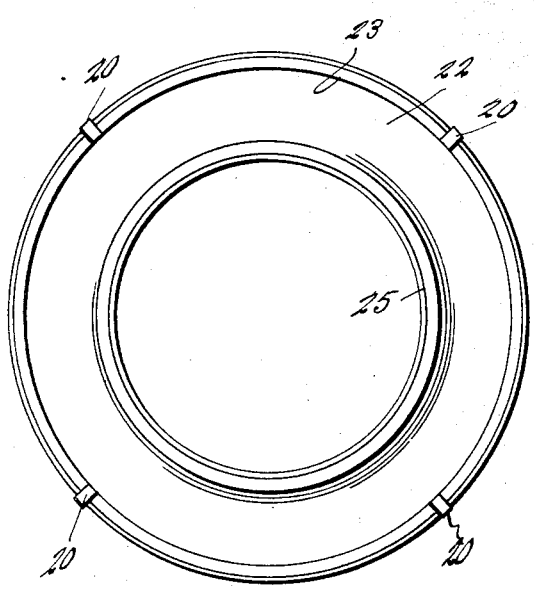
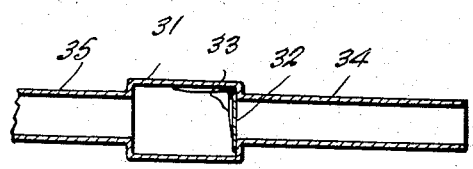
Inventor
Eugene Biancalana
By Clarence A. O'Brien
Attorney Patented Jan. 2, 1934

1,942,082

UNITED STATES PATENT OFFICE 1,942,082

REFRIGERATED MEAT GRINDER

Eugene Biancalana, Richmond Hill, N. Y.

Application March 25, 1932. Serial No. 601,229

1 Claim. (Cl. 257—212)

This invention appertains to new and useful improvements in refrigeration, and more particularly to novel refrigerating means for meat grinders.

The principal object of this invention is to provide an attachment for meat grinders in the form of a refrigerating jacket for maintaining meat in the grinder constantly at a low temperature.

Another important object of the invention is to provide a refrigerating unit for meat grinders which can be readily disassembled for the purpose of repair or replacement of the parts, both in the grinder and in the refrigerating means.

These and other important objects and advantages of the invention will become apparent to the reader of the following specification.

In the drawings:

Fig. 2 represents an irregular central sectional view.

Fig. 5 represents an inside elevational view of the cap.

Fig. 6 represents a fragmentary longitudinal sectional view taken substantially on line 9—9 of Fig. 2.

Figure 1:
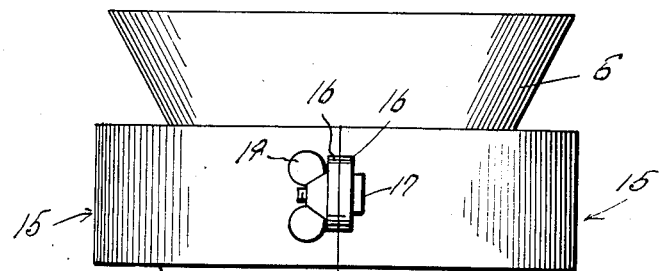
Fig. 1 represents a rear end elevational view of the grinder and refrigerating means.
Figure 3:
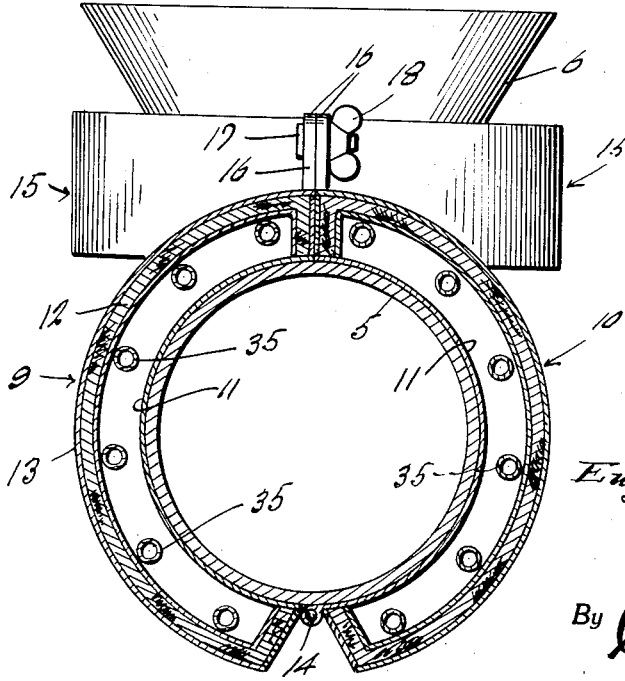
Fig. 3 represents a vertical sectional view.
Figure 4:
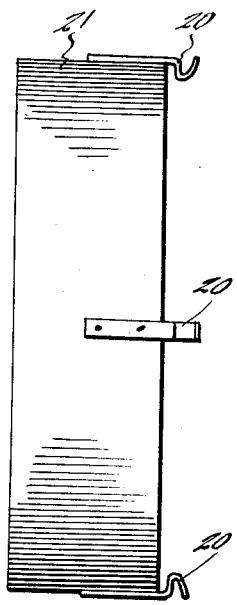
Fig. 4 represents a side elevational view of the removable cap.

Referring to the drawings wherein like numerals designate like parts, it can be seen in Fig. 3, that numeral 5 represents the meat grinder shell which is substantially cylindrical in shape, and which as is clearly shown in Figs. 1, 2 and 3 has a hopper 6 connected thereto so that meat can be fed to the interior of the shell 5.

Numeral 8 represents the polygonal-shaped extension on the worm (not shown) and to which suitable actuating means can be connected.

The refrigerating attachment consists of a pair of hingedly connected sections 9—10, each section consisting of a semi-cylindrical shaped drum 11, the same having inner and outer walls of semi-cylindrical shape and of very fine sheet metal gauge.

Disposed over the outside of each of these sections 9 and 10 and over the end portions thereof, is a heat insulating packing 12, covered by a jacket 13 of some suitable metal or the like to protect the insulating material.

The sections 9—10 are hingedly connected together at their lower portions as at 14 while each of the sections at its upper portion is provided with a semi-circular formation generally referred to by numeral 15. When these semi-circular structures are brought together, they form a collar circumscribing the throat portion of the hopper 6, the same being provided with ears 16 through which a screw 17 can be disposed and equipped with a nut 18 whereby the sections 15 can be clamped together, against the throat portion of the hopper 6.

Similar ears, screws and nut are provided on the sections 9 and 10 as denoted by character references 16, 17 and 18 respectively.

As is clearly shown in Fig. 2, the forward end portions of the sections 9—10 are offset outwardly as at 19 and over the shoulders 19 are engageable the spring retainers 20 protruding from the cap structure 21 which is engageable over the front end of the refrigerating means, the same consisting of the outside shell 22 and the inside insulating packing 23. The intermediate portion of the cap is open as at 24 and rests against the perforated plate 7 of the meat grinder as at 25.

As is clearly shown in Fig. 1, each section 9—10 is provided at its lower portion with a box-like structure 26 provided with a pair of openings 28—29.

In each of the box-like structures 26 is a support 30 for supporting a pair of valve shells 31 in which are flap valves 32 normally urged to closing position by spring means 33. Numeral 34 represents a socket tube which extends to the corresponding opening 28 or 29. As is clearly shown in Fig. 2, a conduit 35 extends vertically in the corresponding drum 11 as at $a$ until it reaches the top of the drum where it is formed arcuately as at $b$ in a horizontal direction to follow the contour of the collar section 15.

From the point $c$, this conduit extends downwardly a short distance and then backwardly as at $d$. The conduit then follows back course and protrudes forwardly as at $e$ before returning as at $f$ to connect to the remaining valve shell 31 of the particular box-like structure 26.

The foregoing arrangement of the refrigerant conduit is provided in each of the sections 9—10. In Fig. 2, numeral 36 generally refers to the connector for interposition between the conduits 35 of each section 9—10 and the tubular lines 37 of the refrigerating system (not shown). Numeral 38 represents a plate having openings therein through which screws 39 can be disposed for attaching the plate to the said boxes 26—26.

Protruding from the upper portion of the plate 38 at the opposite ends of the upper ducts are the tubular projections 45 which can be inserted through the openings 28 in the boxes 26 and into the corresponding tubular sockets 34 (see Fig. 6).

Protruding from the lower portion of the plate 38 are the tubular projections 45 and 46, one being located at each end of a duct, and these tubular projections are engageable through the openings 39 in the box-like structure 26 to engage into the corresponding tubular sockets 34 (see Fig. 6).

It can be seen, that when this connector is engaged with the box-like structure 26, the tubular projections 45 and 46 slide into the tubular socket structure 34 and force the valves 32 backwardly against their springs 33, so that the tubular projections 45 and 46 protrude into the valve shells 31 in the manner substantially shown in Fig. 10.

Obviously, meat can be maintained in the grinder with this novel refrigerating unit attached thereto without the likelihood of the meat spoiling in warm weather, obviously eliminating the practice of keeping the grinder in a refrigerator so as to protect the contained meat, the old practice requiring removal of the meat grinder from the refrigerator every time an order is given.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A refrigerating attachment comprising a pair of semi-cylindrical hollow sections, refrigerating elements in said sections, hinged connections between a pair of corresponding edges of the sections, so as to swingably connect the sections, and securing means between the remaining edges of the sections.

EUGENE BIANCALANA.